US006631317B2

United States Patent
Lu et al.

(10) Patent No.: US 6,631,317 B2
(45) Date of Patent: Oct. 7, 2003

(54) ATTITUDE SENSING SYSTEM FOR AN AUTOMOTIVE VEHICLE

(75) Inventors: Jianbo Lu, Livonia, MI (US); Todd Allen Brown, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/967,038

(22) Filed: Oct. 1, 2001

(65) Prior Publication Data

US 2003/0065430 A1 Apr. 3, 2003

(51) Int. Cl.[7] .................................................. G06F 7/00
(52) U.S. Cl. .......................................... 701/45; 340/440
(58) Field of Search ............................... 701/38, 45, 41, 701/46, 124; 340/440; 280/5.502, 5.506, 5.507

(56) References Cited

U.S. PATENT DOCUMENTS

| | | |
|---|---|---|
| 4,690,553 A | 9/1987 | Fukamizu et al. |
| 4,765,649 A | 8/1988 | Ikemoto et al. |
| 4,827,416 A | 5/1989 | Kawagoe et al. |
| 4,888,696 A | 12/1989 | Akatsu et al. |
| 5,033,770 A | 7/1991 | Kamimura et al. |
| 5,058,017 A | 10/1991 | Adachi et al. |
| 5,066,041 A | 11/1991 | Kindermann et al. |
| 5,163,319 A | 11/1992 | Spies et al. |
| 5,208,749 A | 5/1993 | Adachi et al. |
| 5,228,757 A | 7/1993 | Ito et al. |
| 5,247,466 A | 9/1993 | Shimada et al. |
| 5,408,411 A | 4/1995 | Nakamura et al. |
| 5,598,335 A | 1/1997 | You |
| 5,703,776 A | 12/1997 | Soung |
| 5,732,377 A | 3/1998 | Eckert |
| 5,736,939 A | 4/1998 | Corcoran |
| 5,801,647 A | 9/1998 | Survo et al. |
| 5,809,434 A | 9/1998 | Ashrafi et al. |
| 5,925,083 A | 7/1999 | Ackermann |
| 5,944,392 A | 8/1999 | Tachihata et al. |
| 6,002,974 A | 12/1999 | Schiffmann |
| 6,002,975 A | 12/1999 | Schiffmann et al. |
| 6,038,495 A | 3/2000 | Schiffmann |
| 6,040,916 A | 3/2000 | Griesinger |
| 6,055,472 A | 4/2000 | Breunig et al. |
| 6,065,558 A | 5/2000 | Wielenga |
| 6,141,604 A | 10/2000 | Mattes et al. |
| 6,192,305 B1 | 2/2001 | Schiffmann |
| 6,202,020 B1 | 3/2001 | Kyrtsos |
| 6,233,510 B1 | 5/2001 | Platner et al. |
| 6,535,800 B2 * | 3/2003 | Wallner .......................... 701/1 |
| 6,542,073 B2 * | 4/2003 | Yeh et al. .................... 340/440 |
| 6,542,792 B2 * | 4/2003 | Schubert et al. ............... 701/1 |

FOREIGN PATENT DOCUMENTS

| | | |
|---|---|---|
| EP | 1 002 709 A3 | 5/2000 |
| EP | 1 002 709 A2 | 5/2000 |
| WO | WO 99/64262 | 12/1999 |

* cited by examiner

Primary Examiner—Michael J. Zanelli

(57) ABSTRACT

A stability control system (18) for an automotive vehicle includes a plurality of sensors (28–39) sensing the dynamic conditions of the vehicle. The sensors may include a speed sensor (20), a lateral acceleration sensor (32), a roll rate sensor (34), a yaw rate sensor (20) and a longitudinal acceleration sensor (36). The controller (26) is coupled to the speed sensor (20), the lateral acceleration sensor (32), the roll rate sensor (34), the yaw rate sensor (28) and a longitudinal acceleration sensor (36). The controller (26) has an anti-integration drift filter and a steady state recovery filter. The controller determines a roll attitude angle, a pitch attitude angle and a yaw attitude angle in response to the roll angular rate signal, the yaw angular rate signal, the lateral acceleration signal, the longitudinal acceleration signal, the wheel speed signal, the anti-integration drift filter and the steady state recovery filter.

20 Claims, 3 Drawing Sheets

ATTITUDE SENSING SYSTEM FOR AN AUTOMOTIVE VEHICLE

TECHNICAL FIELD

The present invention relates generally to a control apparatus for controlling a system of an automotive vehicle in response to sensed dynamic behavior, and more specifically, to a method and apparatus for controlling the system of the vehicle by determining attitude of the vehicle.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the roll over characteristic of the vehicle to maintain the vehicle position with respect to the road. That is, it is desirable to maintain contact of each of the four tires of the vehicle on the road.

In vehicle rollover control, it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

It is well-known in aircraft and spacecraft attitude control to use gyro-rate sensors to control the attitude of the aircraft and spacecraft in a rather complicated fashion. The direct integrations of the gyro-rate sensor signals does not provide the actual attitude of the aircraft and spacecraft due to the fact that a large portion of the motion involve 3 dimensional maneuvers, and in those 3-D maneuvers the motion variables are inter-dependent with each other.

The vehicle dynamics control tries to control the yaw stability and roll stability of an automotive vehicle. The task involves three-dimensional motions along its roll, pitch, yaw directions and its longitudinal, lateral and vertical directions. The coupling between the motion directions may not be as strong as in the aircraft and the spacecraft, however they cannot be neglected in most of the maneuvers which involve vehicle rolling over or yawing out of the course. For example, the excessive steering of a vehicle will lead to excessive yaw and lateral motion, which further cause large rolling motion towards the outside of the turning. If the driver brakes the vehicle during the excessive steering, then the vehicle will also experience roll and pitch motions together with lateral and longitudinal accelerations.

In known systems the interdependencies are typically not taken into account. Also, such systems do not provide accurate indications of roll tendencies over large periods of time. That is, when integrations of the sensors are performed, only short term integrations are performed. However, in ramp maneuvers or long curve maneuvers results by such systems have proven inaccurate.

It would therefore be desirable to provide an attitude control system to predict attitude angle for vehicle dynamics control that includes the interdependency among the roll, pitch and yaw motions while compensating for long term maneuvers.

SUMMARY OF THE INVENTION

In the present invention, the interdependency among the vehicle roll, pitch and yaw motion variables is characterized by a set of nonlinear differential equations through the well-known Euler transformation. That is, the roll, pitch and yaw attitude angles of the vehicle are related to the roll, pitch and yaw rates through three nonlinear differential equations. Solving those differential equations numerically theoretically leads to the variables of interest. However, a numerical integration for solving the nonlinear differential equations causes signal drifting. In order to solve this problem, a new integration scheme is proposed. This scheme combines the anti-integration-drift filter with the steady-state value correction to provide true vehicle attitudes.

Reducing system cost is typically a goal in automotive systems. Since one of the three angular rate signals (pitch rate signal) can be predicted from the other available signals, the cost reduction of the system is possible by eliminating a pitch rate sensor.

In one aspect of the invention, a control system for an automotive vehicle includes a plurality of sensors sensing the dynamic conditions of the vehicle. The sensors may include a speed sensor 20, a lateral acceleration sensor 32, a roll rate sensor 34, a yaw rate sensor 26 and a longitudinal acceleration sensor 36. The controller 26 is coupled to the speed sensor 20, the lateral acceleration sensor 32, the roll rate sensor 34, the yaw rate sensor 28 and a longitudinal acceleration sensor 36. The controller 26 has an anti-integration drift filter and a steady state recovery filter. The controller determines a roll attitude angle, a pitch attitude angle, a yaw attitude angle and a pitch rate in response to the roll angular rate signal, the yaw angular rate signal, the lateral acceleration signal, the longitudinal acceleration signal, the wheel speed signal, the anti-integration drift filter and the steady state recovery filter.

In a further aspect of the invention, a method of controlling roll stability of the vehicle comprises the steps of:
generating a plurality of sensor signals in response to vehicle conditions;
estimating a vehicle pitch angle estimation in response to said plurality of sensor signals;
determining a transient roll attitude in response to said pitch angle estimation;
determining a steady state roll attitude angle in response to said pitch angle; and
determining a roll attitude angle estimation in response to the steady state roll attitude angle and the transient roll attitude angle; and
determining a pitch rate estimation in response to the estimated roll and pitch angle estimation, and the yaw rate sensor signal.

One advantage of the invention is that the above methodology may be applied to eliminating another sensor corresponding to roll or yaw while providing a sensor corresponding to pitch.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
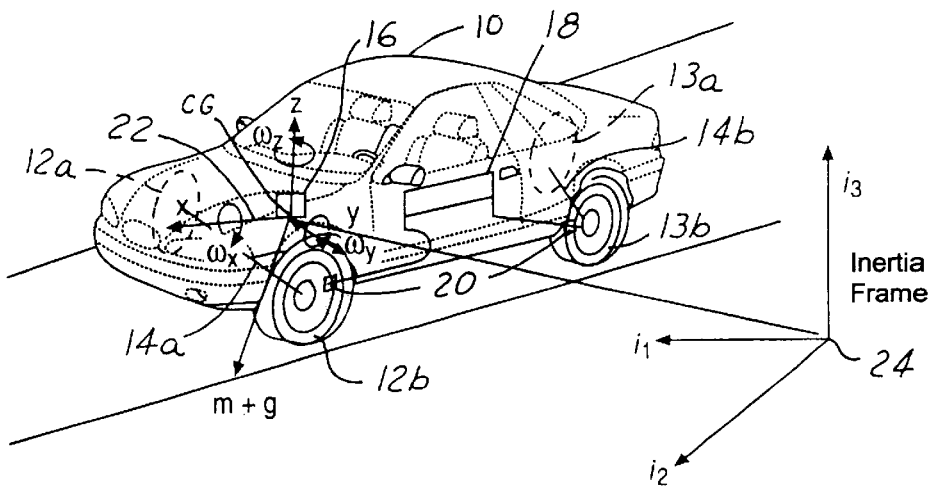
FIG. 1 is a diagrammatic view of a vehicle with variable vectors and coordinator frames according to the present invention.

In the following figures the same reference numerals will be used to identify the same components. The present invention is preferably used in conjunction with a rollover control system for a vehicle. However, the present invention may also be used with a deployment device such as airbag or roll bar.

The present invention estimates and predicts the vehicular attitude used in a rollover control system which prevents the vehicle from rolling over on road. The estimated and predicted variables are used for setting the rollover control action flag and as the feedback signals to construct the control commands. In detail, the rollover control action uses the information from the vehicle attitude sensing system, the available sensors, and the driving/road condition identifiers. The rollover control flag is set based on a series of rollover logic processes. In the case of a positive determination of vehicle rollover, the control commands computed through feeding back the estimated vehicle attitude variables and angular rate signals will be sent to drive the actuators through the rollover controller.

Referring to FIG. 1, an automotive vehicle 10 with a safety system of the present invention is illustrated with the various forces and moments thereon during a rollover condition. Vehicle 10 has front right and front left tires 12a and 12b and rear right tires 13a and left rear tires 13b respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels or vice versa. Generally, the vehicle has a weight represented as M*g at the center of gravity of the vehicle.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. The sensing system 16 preferably uses a standard yaw stability control sensor set (including lateral accelerometer, yaw rate sensor, steering angle sensor and wheel speed sensor) together with a roll rate sensor and a longitudinal accelerometer. The various sensors will be further described below. The wheel speed sensors 20 are mounted at each corner of the vehicle, and the rest of the sensors of sensing system 16 are preferably mounted directly on the center of gravity of the vehicle body, along the directions x,y and z shown in FIG. 1. As those skilled in the art will recognize, the frame from x,y and z is called a body frame 22, whose origin is located at the center of gravity of the car body, with the x pointing forward, y pointing off the driving side (to the left), and the z pointing upward. The angular rates of the car body are denoted about their respective axes as $\omega_x$ for the roll rate, $\omega_y$ for the pitch rate and $\omega_z$ for the yaw rate. The present invention calculations preferably take place in an inertial frame 24 that may be derived from the body frame 22 as described below.

Figure 2:
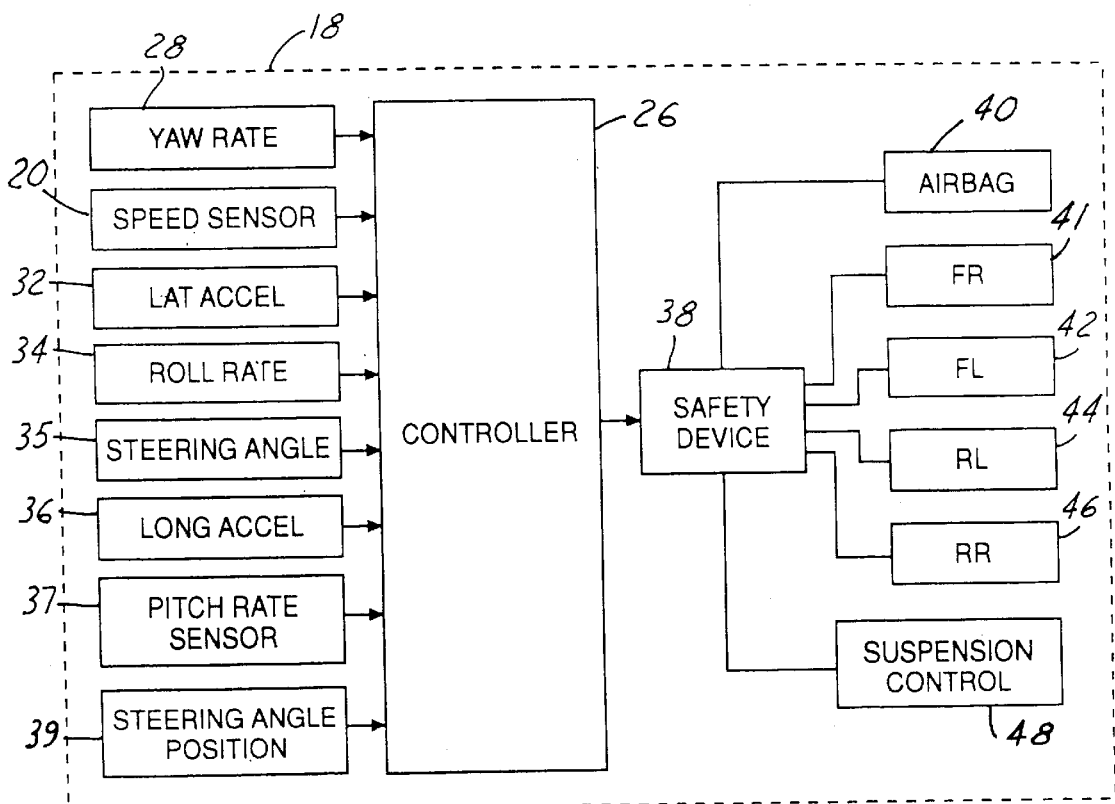
FIG. 2 is a block diagram of a stability system according to the present invention.

Referring now to FIG. 2, roll stability control system 18 has a controller 26 used for receiving information from a number of sensors which may include a yaw rate sensor 28, a speed sensor 20, a lateral acceleration sensor 32, a roll rate sensor 34, a steering angle sensor 35, a longitudinal acceleration sensor 36, a pitch rate sensor 37 and steering angle position sensor 39.

In the preferred embodiment only two axial rate sensors are used. When two of these axial rates are known, the other may be derived using other commonly available sensors.

In the preferred embodiment the sensors are located at the center of gravity of the vehicle. Those skilled in the art will recognize that the sensor may also be located off the center of gravity and translated equivalently thereto.

Also, pitch rate sensor 37 is illustrated, but can be eliminated in the preferred embodiment. As will be seen below, only two axial-type sensors are used while the third axial direction is derived.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors may be used in a commercial embodiment. Safety device 38 may control an airbag 40 or a steering action or braking action at one or more of the wheels 41, 42, 44, 46 of the vehicle. Also, other vehicle components such as a suspension control 48 may be used to adjust the suspension to prevent rollover.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an act of air suspension, a shock absorber sensor such as a load cell, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor 36, lateral or vertical speed sensor including a wheel-based speed sensor, a radar-based speed sensor, a sonar-based speed sensor, a laser-based speed sensor or an optical-based speed sensor.

Steering control 38 may control the position of the front right wheel actuator 40, the front left wheel actuator 41, the rear left wheel actuator 44, and the right rear wheel actuator 46. Although as described above, two or more of the actuators may be simultaneously controlled. For example, in a rack-and-pinion system, the two wheels coupled thereto are simultaneously controlled. Based on the inputs from the sensors, controller 26 determines a roll condition and controls the steering position of the wheels.

Speed sensor 20 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor, For example, if speed is determined while speeding up or braking around a corner, the lowest or highest wheel speed may not be used because of its error. Also, a transmission sensor may be used to determine vehicle speed.

Figure 3:
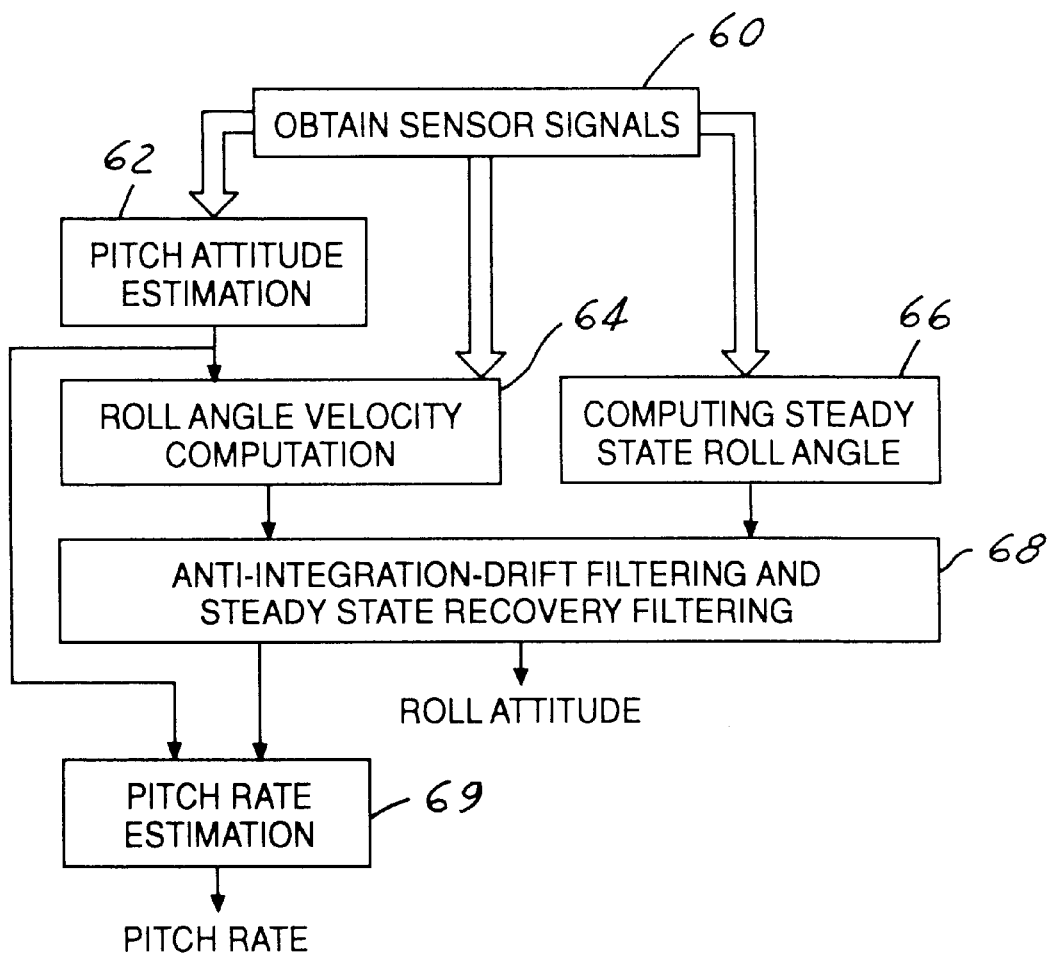
FIG. 3 is a flow chart of a rollover determination according to the present invention.

Referring now to FIG. 3, a method of determining attitude is illustrated. The longitudinal acceleration of the car body along x-axis is denoted as $a_x$. The lateral acceleration of the car body along y-axis is denoted as $a_y$. The wheel speeds, which measures the wheel rotation speeds are denoted as $w_{lf}, w_{rf}, w_{lr}, w_{rr}$ for the left-front, right-front, left-rear and right-rear wheel respectively.

In step 60, sensor data from the above-mentioned sensors is obtained. The roll, pitch and yaw attitude angles of a vehicle are related to the roll rate, pitch rate and yaw rate sensor signals through coupled interactions, rather than simple integrations and differentiations. The simple integrations work when the different motions of the vehicle are decoupled. This is typically impractical and unrealistic because at least some relationship exists between the variables. For example, pure vehicle yaw motion without roll and pitch motions (yaw motion decoupled from roll and pitch) does not ever happen in reality, since whenever there is a yaw motion, the vehicle must have certain roll motion due to the lateral force applied to the vehicle. This implies that the roll attitude of the vehicle not only depends on the roll rate but also the yaw rate. On the other hand the vehicle yaw motion can be affected by the vehicle pitch and roll motion. Hence, complicated relationships exist among the vehicle attitudes and the angular rates. The vehicle roll, pitch and yaw attitude angles are denoted as $\theta_x, \theta_y$ and $\theta_z$, and the roll, pitch and yaw rates as $\omega_x, \omega_y$ and $\omega_z$ then this complicated relationship can be expressed in the following functional relationship where $\phi$ represents a function:

$$\dot{\theta}_x = \phi_x(\omega_x, \omega_y, \omega_z, \theta_x, \theta_y, \theta_z)$$

$$\dot{\theta}_y = \phi_y(\omega_x, \omega_y, \omega_z, \theta_x, \theta_y, \omega_z)$$

$$\dot{\theta}_z = \phi_z(\omega_x, \omega_y, \omega_z, \theta_x, \theta_y, \theta_z) \quad (1)$$

By using Euler transformation, these functional relationships can be further expressed as in the following:

$$\phi_x(\omega_x, \omega_y, \omega_z, \theta_x, \theta_y, \theta_z) = \omega_x + [\omega_y \sin(\theta_x) + \omega_{z3} \cos(\theta_x)]\tan(\theta_y)$$

$$\phi_y(\omega_x, \omega_y, \omega_z, \theta_x, \theta_y, \theta_z) = \omega_y \cos(\theta_x) - \omega_z \sin(\theta_x)$$

$$\phi_z(\omega_x, \omega_y, \omega_z, \theta_x, \theta_y, \theta_z) = [\omega_y \sin(\theta_x) + \omega_z \cos(\theta_x)]\sec(\theta_y) \quad (2)$$

The pitch attitude angle is first estimated from the longitudinal acceleration sensor signal and the vehicle reference velocity as in step 62. The Euler transformation converts the measurements to the inertial frame of reference, and provides a method to compute the roll angle velocity by using the estimated pitch angle. This is done in step 64. Notice that the relationship depicted in Equation (2) reveals complicated nonlinear functions. Equation (2) indicates that a simple integration of the roll rate, i.e., $$\dot{\theta}_x = \omega_x$$

could provide accurate information about the roll attitude angle only if (a) both the pitch and yaw rate are negligible, which means the vehicle is dominated by roll motion; (b) the roll attitude angle and yaw rate are negligible, the pitch attitude is limited; and, (c) the pitch attitude angle is negligible with non-extreme pitch and yaw rates.

The simple integration of the pitch rate, i.e., $$\dot{\theta}_y = \omega_y$$

could lead to accurate prediction of the pitch attitude angle if the roll attitude angle is negligible and the yaw rate is not extremely large.

The yaw attitude angle could be obtained from simple integration of the yaw rate sensor only if the pitch and roll attitude are negligible with non-extreme pitch rate.

Simple integrations of the roll rate and pitch rate sensor signals to predict the vehicle roll and pitch attitude angles are known. The above discussion indicates the drawbacks of those approaches, since the following is simultaneously true:

$$\dot{\theta}_x \approx \omega_x, \dot{\theta}_y \approx \omega_y$$

only if $\theta_x \approx 0$ and $\theta_y \approx 0$, or $\theta_x \approx 0$ and $\omega_z \approx 0$. That is, either the vehicle has small roll and pitch attitude angles or the vehicle has small roll attitude angle plus small yaw rate, which contradict with the purpose of using them in rollover and pitchover detection, since both roll and pitch attitude angles are large, and the vehicle usually experience combined roll, pitch and yaw motions. The methods proposed in prior known applications cannot be useful to generating the rollover feedback control signal.

In the preferred embodiment, a pitch rate sensor is not used and therefore, this value is derived. Since the nonlinear relationship in Equation (1) involves 6 variables $\theta_x, \theta_y, \theta_z, \omega_x, \omega_y$ and $\omega_z$ with 3 equations, hence any combination of the 3 variables could be used to generate the rest three variables through the relationship in Equation (1). One possible choice is to solve $\theta_x, \theta_z, \omega_y$ through Equation (1) from known $\theta_y, \omega_x$ and $\omega_z$, i.e., $$\dot{\theta}_x = \psi_x(\omega_x, \omega_z, \theta_y; \theta_x)$$

$$\omega_x = \psi_y(\omega_x, \omega_z, \theta_y)$$

$$\dot{\theta}_z = \psi_z(\omega_x, \omega_z, \theta_y; \theta_x) \quad (3)$$

The detailed formula for the functions in Equations (3) can be obtained as:

$$\psi_x = \omega_x + \dot{\theta}_y \tan(\theta_y)\tan(\theta_x) + \omega_z \tan(\theta_y)sec(\theta_x)$$

$$\psi_y = \dot{\theta}_y sec(\theta_x) + \omega_z \tan(\theta_x) \quad (4)$$

Hence if an accurate prediction of the pitch attitude angle is available in step 64, then through the relationships in Equation (4), both the roll attitude angle and the pitch rate can be computed by solving a nonlinear differential equation. Then pitch attitude angle must be determined. Besides the roll and yaw angular rate sensors, the longitudinal acceleration sensor and the wheel speed sensors are available. In the following, consider how the longitudinal acceleration and the wheel speed sensors are used to sense the vehicle pitch attitude angle. It is standard in anti-lock-brake systems that the four wheel speed sensor signals can be used to construct the vehicle longitudinal velocity $V_{ref}$, the following function relationship is true:

$$V_{ref}=f(w_{lf},w_{rf},w_{lr},w_{rr})$$

Since the longitudinal accelerometer senses the resultant acceleration caused by the vehicle longitudinal motion and the gravity projected along the vehicle body frame y-axis, hence the following holds:

$$a_x=\dot{V}_{ref}-g\sin(\theta_y)$$

where g is the gravity. An estimation for the pitch attitude angle can be obtained as, which is implemented in step 62

$$\hat{\theta}_y = \sin^{-1}\left\{\frac{\dot{V}_{ref} - a_x}{g}\right\} \quad (5)$$

Using the above estimated pitch angle, the roll attitude angle of the vehicle will obey the following nonlinear differential equation as described in Equation (4):

$$\dot{\theta}_x=\omega_x+\dot{\hat{\theta}}_y\tan(\hat{\theta}_y)\tan(\theta_x)+\omega_z\tan(\hat{\theta}_y)\sec(\theta_x) \quad (6)$$

In order to solve the nonlinear differential Equation (6) on real time for the roll attitude angle $\theta_x$, a digital integration process is needed. A simple Euler integration can be written as the following:

$$\theta_x(k+1)=\theta_x(k)+\Delta T\Theta(k+1)$$

$$\theta_x(0)=\theta_0 \quad (7)$$

where $\theta_x(k+1)$ and $\Theta(k+1)$ mean the values of variable $\theta_x$ and $\Theta$ at the kth sampling time instant, for k=0, 1, 2, . . . , and with $\Theta$ having the following form:

$$\Theta(k+1) = \omega_x(k+1) + \dot{\hat{\theta}}_y(k+1)\tan(\hat{\theta}_y(k+1))\tan(\theta_x(k)) + \omega_z(k+1)\tan(\hat{\theta}_y(k+1))\sec(\theta_x(k)) \quad (8)$$

$\theta_0$ is the initial vehicle roll attitude angle. If the vehicle starts when it is parked on a flat road, then $\theta_0=0$, which is usually the case. Notice that in Equation (8) the roll attitude angle uses the past value $\theta_x(k)$ instead of the current value $\theta_x(k+1)$. This computation of $\Theta$ is done in step 64.

Although Equation (7) provides a feasible computation algorithm for roll attitude angle prediction, it shares the common drawback occurring in the digital implementation of the pure integration. That is, low frequency drift happens. In order to reduce or eliminate pure-integration-induced roll attitude angle drift, an anti-integration-drift (AID) filter is used in step 68 together with a steady-state recovery scheme. This AID filter has the following form:

$$T_{AID}(z^{-1}) = \frac{d_1(1-z^{-2})}{1-c_1 z^{-1}+c_2 z^{-2}}$$

A digital implementation of the solver for Equation (6) using AID filter can be expressed as the following:

$$\theta_{x\text{-}AID}(k+1)=c_1\theta_{x\text{-}AID}(k)-c_2\theta_{x\text{-}AID}(k-1)]+d_1[\Theta(k+1)-\Theta(k-1)]$$

$$\theta_{x\text{-}AID}(0)=\theta_0 \quad (9)$$

Although the integration process described in Equation (9) solves the drift problem associated with pure integration, the non-drift but constant roll attitude angle is not generated since all the low frequency or non-zero steady-state portion of the roll attitude has been washed out to zero in Equation (9). However, in the roll attitude prediction it is necessary to sense the roll attitude angle when the vehicle experiences steady state roll attitude. For example, if the vehicle is driven in constant speed on a circle, or in a banked road with constant bank angle, the vehicle experiences almost constant roll angle. The sensing algorithm must be further defined. In order to solve this issue, a steady state recovery scheme is used in step 68. This scheme uses the lateral acceleration information. The lateral acceleration $a_y$ measured by the lateral acceleration sensor contains the gravity portion $a_{y\text{-}gravity}$ due to the roll and pitch attitude angle and the gravity g, the longitudinal acceleration portion $a_{y\text{-}long\text{-}acc}$ due to $\dot{V}_{ref}$ and the vehicle side slip angle, the yaw portion $a_{y\text{-}yaw}$ due to vehicle velocity $V_{ref}$ and the yaw rate $\omega_z$, the side-slip velocity portion $a_{y\text{-}side\text{-}slip}$ due to the vehicle side slip velocity and the vehicle velocity $V_{ref}$. If considering all the above effects, the formula for $a_y$ could be expressed as:

$$a_y=a_{y\text{-}gravity}+a_{y\text{-}long\text{-}acc}+a_{y\text{-}yaw}+a_{y\text{-}side\text{-}slip} \quad (10)$$

where the components can be further expressed as:

$$a_{y\text{-}gravity}=g\sin(\theta_x)\cos(\theta_y)$$

$$a_{y\text{-}long\text{-}acc}=\dot{V}_{ref}\sin(\beta)$$

$$a_{y\text{-}yaw}=\omega_z V_{ref}\cos(\beta)$$

$$a_{y\text{-}side\text{-}slip}=\dot{\beta}V_{ref}\cos(\beta) \quad (11)$$

Hence the exact roll attitude can be computed from:

$$\theta_x = \sin^{-1}\left\{\frac{a_y - a_{y\text{-}long\text{-}acc} - a_{y\text{-}yaw} - a_{y\text{-}side\text{-}slip}}{g\cos(\theta_y)}\right\} \quad (12)$$

Although Equation (12) is exact, it is less useful for obtaining the roll attitude due to the fact that the side slip angle $\beta$ needs to be determined first. In the traditional yaw stability control, the side-slip angle $\beta$ is computed by either solving the following equation:

$$\dot{\beta} = \frac{a_y}{V_{ref}} - \omega_z - \frac{\dot{V}_{ref}}{V_{ref}}\beta \quad (13)$$

which is an approximation of the Equation (10) by neglecting the gravity term $a_{y\text{-}gravity}$, or solving from a linear bicycle model. Those ways of computing cannot provide a side slip angle which is accurate enough for Equation (12) to be used, especially for maneuvers involving potential rollovers.

However in steady state driving condition, both $\dot{\beta}$ and $\dot{V}_{ref}$ are zero, and $\beta$ is small. Hence in steady state driving condition the roll attitude can be computed from the following, which is implemented in step 66

$$\theta_{x\text{-}ssdc} = \sin^{-1}\left\{\frac{a_y - V_{ref}\omega_z}{g\cos(\theta_y)}\right\} \quad (14)$$

An approximation of the roll attitude can be obtained as $$\theta_x \approx \theta_{x-ssdc} + \sin^{-1}\left\{\frac{V_{ref}\beta + \dot{V}_{ref}\sin(\beta)}{g\cos(\theta_y)}\right\} \quad (15)$$

Two computed signals: $\theta_{x\text{-}AID}$ computed from the iterative scheme in Equation (9) and $\theta_{x\text{-}ssdc}$ computed from equation (14), are used to capture certain portion of the true roll attitude signal. $\theta_{x\text{-}AID}$ extracts the dynamic portion of the roll attitude and removing the components caused by the steady state driving condition. While $\theta_{x\text{-}ssdc}$ is a poor indicator for dynamic roll attitude but captures well the portion of roll attitude caused by the steady state driving condition. The question is how to combine $\theta_{x\text{-}AID}$ and $\theta_{x\text{-}ssdc}$ to get a better roll attitude estimation. This is the task of the blending scheme implemented in step 68.

Let's further explain what has been done in step 68. Given two signals $\dot{\phi}_1$ and $\phi_2$, where $\phi_2$ captures well the steady state value of the true signal $\phi_1$, a good estimation $\hat{\phi}_1$ of the true signal $\phi_1$ need to be found.

Due to the specific feature of the anti-integration-drift (AID) filter, an AID filtered $\dot{\phi}_2$ will remove the steady state portion of the signal and keep the transient portion of $\phi_2$. Hence the true DC term of $\phi_2$ can be isolated from $\phi_2$ by subtracting the AID filtered $\dot{\phi}_2$ from $\phi_2$. This is called the steady-state-recovery (SSR) scheme since $\phi_2$ captures the steady-state portion of $\phi_1$ well.

Figure 4:
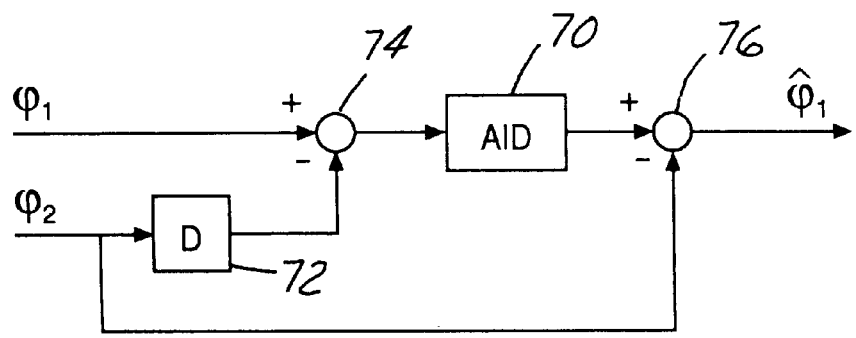
FIG. 4 is a block diagrammatic view of a blending scheme of the present invention.

The transient portion of $\phi_1$ is in the known rate signal $\dot{\phi}_1$. Notice that a pure integration of $\dot{\phi}_1$ for $\phi_1$ is not used due to the potential drift problem as mentioned before. The anti-integration-drift filter is used again here to extract the transient portion of $\phi_1$. Adding this AID filtered to the DC term generated before, a method for estimating $\phi_1$ might be generated. This consideration leads to the signal blending scheme shown in FIG. 4. An anti-integration-drift filter 70 and numerical differentiation block 72 are combined in a summary block 74. $\phi_2$ is also combined with the output of anti-integration-drift filter 70 in summing block 76. In order to mathematically assess this intuitive signal blending, the frequency domain description of this scheme is considered. Let the continuous time version of the AID filter from step 66 as:

$$T_{AID}(s) = \frac{s}{s^2 + e_1 s + e_2} \quad (16)$$

then in frequency domain, the scheme in FIG. 4 can be expressed as:

$$\hat{\phi}_1 = T_{AID}(s)\dot{\phi}_1 + (1 - sT_{AID}(s))\phi_2 \quad (17)$$

If the true signal $\phi_1 = \phi_2$, then in frequency domain we must have:

$$\dot{\phi}_1 = s\phi_2$$

Substituting this into Equation (17) leads to:

$$\hat{\phi}_1 = T_{AID}(s)s\phi_2 + (1 - sT_{AID}(s))\phi_2 = \phi_2 = \phi_1$$

In steady state, the DC term of $\hat{\phi}_1$ can be computed from:

$$\lim_{s \to 0} \hat{\phi}_1 = \lim_{s \to 0} [T_{AID}(s)\dot{\phi}_1 + (1 - sT_{AID}(s))\phi_2] = \lim_{s \to 0} \phi_2$$

Therefore, the DC term of $\hat{\phi}_1$ using the scheme in Equation (17) is equal to the DC term of the signal $\phi_2$, which is further a good capture of the steady state value of $\phi_1$.

In high frequency region, the magnitude of $|s|$ is large, hence Equation (17) can be rewritten as:

$$\hat{\phi}_1 \approx \frac{s}{s^2}\dot{\phi}_1 + \frac{e_2}{s^2}\phi_2 \approx \frac{1}{s}\dot{\phi}_1 = \phi_1$$

Hence we conclude that the scheme in Equation (17), or the signal blending scheme shown in FIG. 4 provides a good estimation for the true signal $\phi_1$ in almost all the frequency ranges, for a given rate signal $\dot{\phi}_1$ and a given signal $\phi_2$ which captures the steady state feature of $\phi_1$.

As discussed before, the signal $\Theta$ computed from Equation (8) is the roll angle velocity (not roll angular rate, but the time derivative of the roll angle $\theta_x$), and the signal $\theta_{x\text{-}ssdc}$ computed in Equation (14) is a good indication of the roll attitude angle during steady state driving conditions. Hence $\Theta$ here has the role of $\dot{\phi}_1$, and $\theta_{x\text{-}ssdc}$ has the role of $\phi_2$, while the desired roll angle attitude has the role of $\phi_1$. By blending them together using the scheme in Equation (17) or in FIG. 4, we have the following in frequency domain:

$$\hat{\theta}_x = T_{AID}(s)\Theta + T_{SSR}(s)\theta_{x\text{-}ssdc} \quad (18)$$

where the transfer function $T_{SSR}(s)$ is called the steady-state-recovery filter since it recovers the steady-state value in step 68 of the roll attitude from $\theta_{x\text{-}ssdc}$, and which has the following form:

$$T_{SSR}(s) = \frac{e_1 s + e_2}{s^2 + e_1 s + e_2} \quad (19)$$

After step 68, the roll attitude can be obtained. Step 69 uses this roll attitude angle and the pitch angle determined from the estimation scheme depicted in step 62 to construct pitch rate.

Up to now, all the signals to determine the vehicle motion and its motion changes has been determined from either the estimation schemes proposed in this invention or from the available sensor signals. The vehicle attitudes and its angular rates represent the rotational motion. The roll and yaw stability control of a vehicle aims to maintain the vehicle attitudes away from the limit. Hence using control actuation to regulate the involved vehicle attitudes and attitude changes keeps the vehicle safe. For rollover control purpose, the roll attitude is sued as feedback (together with other variables) to construct a control command for the controller 26 in FIG. 2. The roll attitude together with the other sensed and calculated variables are also used to conduct road condition detection, driving condition detection and the rollover event detection.

Figure 5A:
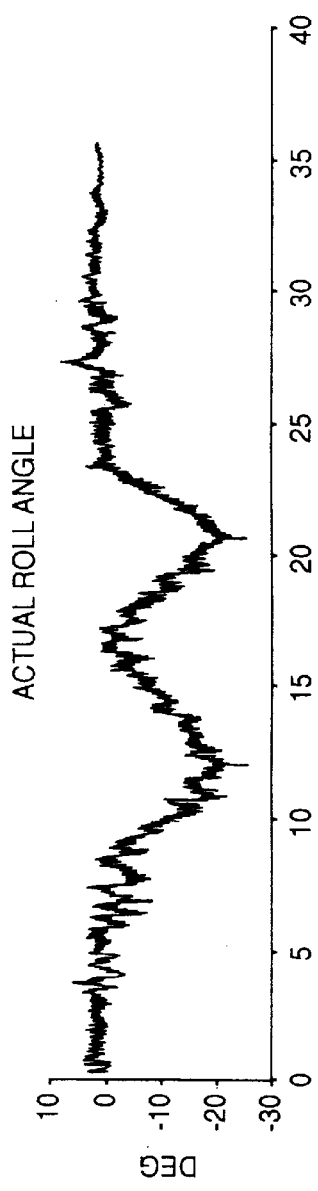
FIG. 5 is a plot of actual roll angle, estimated roll angle, and roll velocity versus time.
Figure 5B:
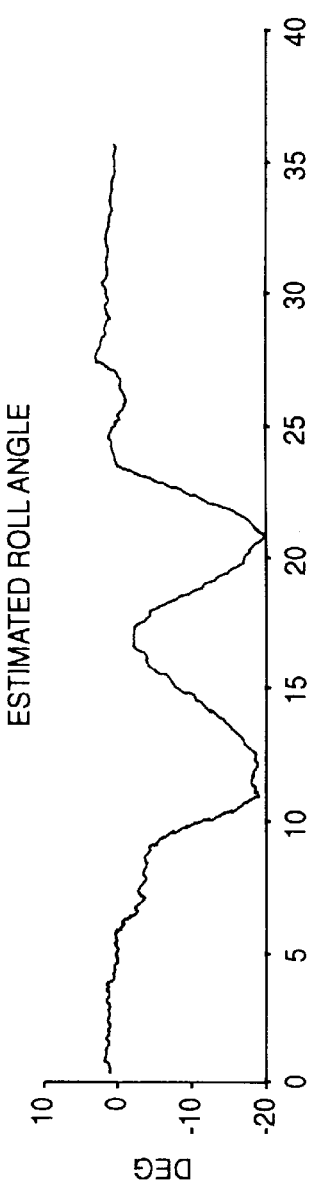
Figure 5C:
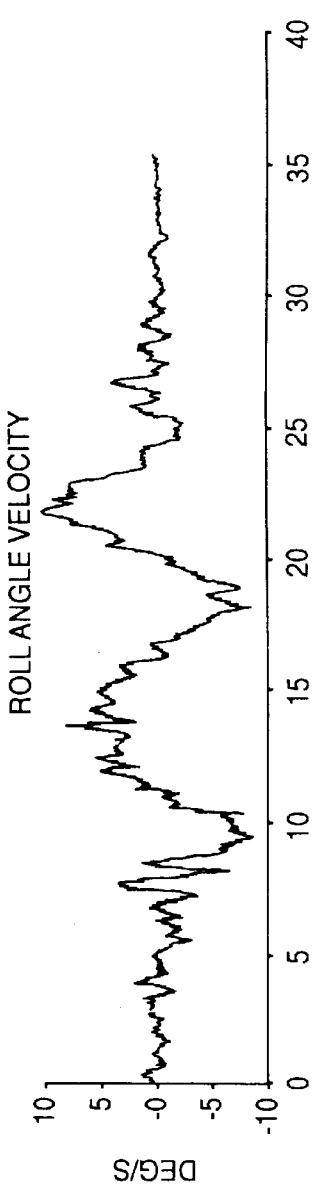

Referring now to FIG. 5, a plot illustrating the roll angle of a vehicle driven on a banked road with 25 degree at the top of the bank, and zero degree on the bottom of the bank. The car was driven from bottom of the bank (0 degree) to the top of the bank (25 degree) and then coming back in twice. The measured roll angle (using optical angular position sensor, or GPS sensor, etc.) was shown on the top plot. The estimated roll angle was shown on the middle plot. The computed roll angle velocity based on the roll rate sensor signal, the estimated pitch angle and the yaw rate sensor signal is shown on the bottom plot.

While particular embodiments of the invention have been shown and described, numerous variations and alternate embodiments will occur to those skilled in the art. Accordingly, it is intended that the invention be limited only in terms of the appended claims.

What is claimed is:

1. A control system for an automotive vehicle having a vehicle body comprising:

a first angular rate sensor generating a first angular rate signal corresponding to a first angular motion of the vehicle body;

a second angular rate sensor generating a second motion signal corresponding to a second angular motion of the vehicle body;

a lateral accelerometer generating a lateral acceleration signal corresponding to a lateral acceleration of a center of gravity of the vehicle body;

a longitudinal accelerometer generating a longitudinal acceleration signal corresponding to the longitudinal acceleration of the center of gravity of the vehicle body;

a wheel speed sensor generating a wheel speed signal corresponding to a wheel speed of the vehicle; and a controller coupled to said first angular rate sensor, said second angular rate sensor, said lateral accelerometer, said longitudinal accelerometer, and said wheel speed sensor, said controller comprising an anti-integration drift filter and a steady state recovery filter, said controller determining a roll attitude angle, a pitch attitude angle and a yaw attitude angle in response to said first angular rate signal, said second angular rate signal, said lateral acceleration signal, said longitudinal acceleration signal, said wheel speed signal, said anti-integration drift filter and said steady state recovery filter.

2. A system as recited in claim 1 wherein said first angular rate sensor is one selected from the group of a yaw rate sensor, a pitch rate sensor and a roll rate sensor and said second angular rate sensor comprises is one selected from the group of a yaw rate sensor, a pitch rate sensor and a roll rate sensor, said second sensor being different than the first sensor.

3. A control system for an automotive vehicle having a vehicle body comprising;

a roll angular rate sensor generating a roll angular rate signal corresponding to a roll angular motion of the vehicle body;

a yaw angular rate sensor generating a yaw motion signal corresponding to a yaw motion of the vehicle body;

a lateral accelerometer generating a lateral acceleration signal corresponding to a lateral acceleration of a center of gravity of the vehicle body;

a longitudinal accelerometer generating a longitudinal acceleration signal corresponding to the longitudinal acceleration of the center of gravity of the vehicle body;

a wheel speed sensor generating a wheel speed signal corresponding to a wheel speed of the vehicle; and a controller coupled to said roll angular rate sensor, said yaw angular rate sensor, said lateral accelerometer, said longitudinal accelerometer, and said wheel speed sensor, said controller comprising an anti-integration drift filter and a steady state recovery filter, said controller determining a roll attitude angle, a pitch attitude angle and a yaw attitude angle in response to said roll angular rate signal, said yaw angular rate signal, said lateral acceleration signal, said longitudinal acceleration signal, said wheel speed signal, said anti-integration drift filter and said steady state recovery filter.

4. A control system as recited in claim 3 further comprising a safety system coupled to said controller, said controller generating a control signal to said safety system in response to said roll attitude angle, said pitch attitude angle and said yaw attitude angle.

5. A control system as recited in claim 4 wherein said safety system comprises an active brake control system.

6. A control system as recited in claim 4 wherein said safety system comprises an active rear steering system.

7. A control system as recited in claim 4 wherein said safety system comprises an active front steering system.

8. A control system as recited in claim 4 wherein said safety system comprises an active anti-roll bar system.

9. A control system as recited in claim 4 wherein said safety system comprises an active suspension system.

10. A method for operating a vehicle control system comprising:

generating a plurality of sensor signals in response to vehicle conditions comprising a roll rate sensor signal, a vehicle velocity signal and a longitudinal acceleration signal;

generating a yaw rate sensor signal;

estimating a vehicle pitch angle estimation in response to said plurality of sensor signals;

determining a transient roll attitude angle in response to said pitch angle estimation, roll rate sensor signal, yaw rate sensor signal;

determining a steady state roll attitude angle in response to said pitch angle estimation, vehicle velocity signal and longitudinal acceleration signal;

determining a roll attitude angle estimation in response to the steady state roll attitude angle and the transient roll attitude angle;

determining a pitch rate estimation in response to the roll and pitch angle estimation and the yaw rate sensor signal; and activating a safety device in response to the roll attitude angle estimation.

11. A method as recited in claim 10 wherein said step of determining a roll attitude angle estimation is performed using an anti-drift-integration filter and a steady-state recovery filter to estimate the roll attitude angle.

12. A method as recited in claim 10 wherein said step of determining a roll attitude angle estimation is performed in response to roll angle velocity.

13. A method as recited in claim 10 wherein said step of determining a roll attitude angle estimation is performed in response to an anti-drift-integration filter.

14. A method of operating a safety device for an automotive vehicle comprising the steps of:

determining a yaw rate for the vehicle;

determining a roll rate for the vehicle;

determining a lateral acceleration for the vehicle;

determining a longitudinal acceleration of the vehicle;

determining vehicle speed;

generating a rollover signal in response to said yaw rate, roll rate, lateral acceleration, longitudinal acceleration, vehicle speed, an anti-integration drift filter, and a steady state recovery filter; and operating a safety device in response to said rollover signal.

15. A method as recited in claim 14 further comprising the step of activating a safety device in response to said rollover signal.

16. A method as recited in claim 15 wherein said step of activating a safety device comprises one selected from the group consisting of an active brake control system, an active rear steering system, an active front steering system, an active anti-roll bar system, and an active suspension system.

17. A method of operating a safety device for an automotive vehicle comprising the steps of:

determining a first angular rate for the vehicle;

determining a first acceleration for the vehicle;

determining a second acceleration for the vehicle;

determining vehicle speed; and generating a rollover signal in response to said first angular rate, said second angular rate, said first acceleration, said second acceleration, a vehicle speed, an anti- integration drift filter, and a steady state recovery filter; and operating a safety device in response to said rollover signal.

18. A method as recited in claim 17 further comprising the step of activating a safety device in response to said rollover signal.

19. A method as recited in claim 18 wherein said step of activating a safety device comprises one selected from the group consisting of an active brake control system, an active rear steering system, an active front steering system, an active anti-roll bar system, and an active suspension system.

20. A method as recited in claim 17 further comprising determining a second angular rate for the vehicle and wherein the step of generating a rollover signal comprises generating a rollover signal in response to said first angular rate, said second angular rate, said first acceleration, said second acceleration, a vehicle speed, the anti-integration drift filter, and the steady state recovery filter.

* * * * *

UNITED STATES PATENT AND TRADEMARK OFFICE
CERTIFICATE OF CORRECTION

PATENT NO. : 6,631,317 B2
DATED : October 7, 2003
INVENTOR(S) : Jianbo Lu and Todd Allen Brown It is certified that error appears in the above-identified patent and that said Letters Patent is hereby corrected as shown below:

Column 11,
Line 40, Claim 2, should read as follows:
-- 2. A system as recited in claim 1 wherein said first angular rate sensor is one selected from the group of a yaw rate sensor, a pitch rate sensor and a roll rate sensor and said second angular rate sensor comprises one selected from the group of a yaw rate sensor, a pitch rate sensor and a roll rate sensor, said second sensor being different than the first sensor. --

Column 13,
Line 13, Claim 17, should read as follows:
-- 17. A method of operating a safety device for an automotive vehicle comprising the steps of:
determining a first angular rate for the vehicle;
determining a first acceleration for the vehicle;
determining a second acceleration for the vehicle;
determining vehicle speed; and
generating a rollover signal in response to said first angular rate, said first acceleration, said second acceleration, vehicle speed, an anti-integration drift filter, and a steady state recovery filter; and
operating a safety device in response to said rollover signal. --

UNITED STATES PATENT AND TRADEMARK OFFICE
CERTIFICATE OF CORRECTION

PATENT NO. : 6,631,317 B2
DATED : October 7, 2003
INVENTOR(S) : Jianbo Lu and Todd Allen Brown It is certified that error appears in the above-identified patent and that said Letters Patent is hereby corrected as shown below:

<u>Column 14,</u>
Line 14, Claim 20, should read as follows:
-- 20. A method as recited in claim 17 further comprising determining a second angular rate for the vehicle and wherein the step of generating a rollover signal comprises generating a rollover signal in response to said first angular rate, said second angular rate, said first acceleration, said second acceleration, vehicle speed, the anti-integration drift filter, and the steady state recovery filter. --

Signed and Sealed this

Sixth Day of April, 2004

JON W. DUDAS
*Acting Director of the United States Patent and Trademark Office*